3,463,646
SEMI-CRYSTALLINE GROUND COATS HAVING CONTROLLED $P_2O_5/B_2O_3$ RATIO

John R. Little, Fairport, and Elbert A. Sanford, Rochester, N.Y., assignors, by mesne assignments, to Sybron Corporation, a corporation of New York
No Drawing. Filed Nov. 20, 1964, Ser. No. 412,850
Int. Cl. C03c 5/00, 7/04
U.S. Cl. 106—48                                    4 Claims

ABSTRACT OF THE DISCLOSURE

Disclosed is a glass composition containing 5–20% of $P_2O_5$ and $B_2O_3$, the ratio of $P_2O_5/B_2O_3$ being within the range of 1:3 and 2:1, 4–20% of alkaline earth oxide; 9–23% of alkali oxide; 0–20% of $TiO_2$; and 45–65% of $SiO_2$. The glass composition has relatively high oxide solubility coupled with the ability to crystallize and has use as a ground coat enamel for mild steel or other substrates that tend to form substantial amounts of oxide scale when heated.

---

This invention relates generally to improved ground coat compositions for use in the manufacture of glass or vitreous enamel coated metals and more particularly relates to improved ground coat compositions for use in systems comprising mild or low-carbon steels with partially crystallized cover coats thereover.

Glass coated metals are widely used in the chemical and pharmaceutical industries as construction materials for applications that require a combination of strength and exceptional corrosion resistance.

To assure good adhesion between the base metal and the glass coatings, it is common to pretreat the surface, as by sandblasting, degreasing, decarburization, etc. A further expedient, well known in the art, is the application of a so-called "ground coat" enamel upon the surface of the metal. Ground coats are specially formulated to enhance uniform coating over the base metal and to form a strong bond between the surface or cover coat and the base metal. These ground coats are characterized by low surface tension, the ability to wet the metal surface and capacity to dissolve oxides that form when the composite article is heated. In addition to improved adherence, the ground coat also must be substantially free of enameling defects such as pin holes, and should be effective in controlling or contributing to the properties of the glass metal composite. After the aforesaid ground coat has been applied, one or more cover coats are applied thereover. These cover coats are formulated to provide the surface characteristics required for the particular application.

Recently, partially-crystallized glass cover coats have been developed for use at temperatures in excess of 1000° F. Although many ground coat formulations are presently available, they were developed for use in systems where operating temperatures seldom exceeded 500° F. and are not suitable for use at significantly higher temperatures, because they exhibit softening temperatures, i.e., the temperature at which flow will occur, of less than 1000° F. Because of the relatively low softening points of these conventional ground coats, they are susceptible to thermal degradation when used at the normal operating temperatures of these newly developed high temperature surface or cover coatings. This degradation results in a premature failure of the glass-metal composite.

In addition to better thermal properties, these new cover coats exhibit physical and mechanical properties, such as resistance to thermal shock and impact, that far exceed the properties of conventional ground coats. Thus when conventional ground coats are used with these new high strength cover coats, the properties of the cover coat cannot be fully utilized because of the weaknesses of the ground coat. The primary object of this invention is to provide ground coats that will cover low-carbon or mild steels, crystallize in situ and have increased physical and thermal properties compared to conventional amorphous ground coats used for mild steels.

A ground coat suitable for use in a glass-metal system must also exhibit certain viscosity characteristics. During the initial firing, it is important that the glass flow rapidly and easily over the metal substrate to assure uniform coating and an intimate contact therewith that will facilitate the formation of a strong bond between the ground coat and the metal substrate. A viscosity at fusion of 1000 to 10,000 poises has been found suitable, and the preferred viscosity at fusion is about 3000 poises. However, to provide desirable physical properties, such as thermal shock resistance, impact resistance and thermal stability, it is necessary to strengthen the ground coat by making it more refractory. To solve the above problems, it has been proposed to increase the refractoriness of ground coats by adding refractory oxides to the presently used amorphous compositions. However, we have found that the refractory coatings produced in this manner exhibit erratic physical properties when used in glass-metal systems. It has also been proposed to vary the composition of the ground coat to achieve a high softening point. Although such variation may produce more refractory coatings, the resultant ground coats exhibit high viscosity at normal firing temperatures and therefore require excessively high firing temperatures to produce the low viscosity necessary to provide smooth even coatings. It is thus another object of this invention to provide a ground coat composition that exhibits the combined properties of low viscosity during the initial firing and increased refractoriness in the final product.

Because of the higher operating temperatures of systems including these new cover coats, it is necessary to provide ground coats that have sufficient thermal stability to inhibit excessive thermal degradation during use. It is accordingly an object of this invention to provide ground coats exhibiting thermal stability when exposed to temperatures in excess of 1000° F. for several hundred hours.

A successful ground coat must provide good adherence between the base metal and the cover coat. Furthermore it is well known, within the enameling art, that the ground coat must be able to dissolve the scale formed on the base metal during firing before good adherence can be obtained. Scale solution is particularly important when the substrate to be enameled is a mild or carbon steel (steel containing up to 0.25% carbon) in contrast to a high alloy material, as mild steels form substantially more oxide scale. In a co-pending application we have proposed the crystallization in situ of a ground coat as a means for improving the physical properties of a glass-metal composite including a metal substrate in which the major elements are cobalt, chromium, nickel, iron, or combinations thereof. However, in attempting to formulate crystallizable ground coats for use on mild steel substrates we found that the proposed compositions for high-alloy materials were not suitable as they could not adequately dissolve the scale. Furthermore we found that the conventional practice, used in formulating conventional amorphous ground coats for mild steels, of adding $B_2O_3$ was unsuitable, as in amounts necessary for scale solution $B_2O_3$ severely limited or prevented crystal growth and generally lowered the thermal expansivity of the ground coat, resulting in undesirably high shearing stresses at the ground coat metal interface.

In contrast, we have found that by the inclusion of $P_2O_5$ and $B_2O_3$ within a critical ratio that the combined goals of scale solution and crystallization are achieved. Accordingly, it is a basic object of this invention to provide $P_2O_5$-containing ground coat compositions capable of dissolving scale formed on mild steel substrates, having thermal expansivities compatible with mild steel substrates, and exhibiting crystallization properties suitable for enameling purposes.

To function properly as a composite article, the thermal expansivity of the individual glass coats must be carefully controlled to obtain maximum physical properties. Glass or vitreous enamel is known to be stronger in compression than in tension, thus thermal expansion of the ground coat should not be greater than that of the base metal. However, even though compression is desirable, the magnitude of such compression should be controlled. Where the thermal expansivity of the ground coat is the same as or only slightly less than the base metal, interfacial shearing stresses are reduced. Furthermore, since the ground coat is sandwiched between the base metal and the cover coat these same conditions dictate that the cover coat thermal expansivity should be the same as or slightly less than the ground coat. This lowers the interfacial stress and thereby minimizes the possibility of violent failure when the composite is exposed to thermal shock. Thermal expansion characteristics are also important in preventing catastrophic losses on impact. A ground coat suitable for use with mild steels should have a thermal expansion coefficient of $4-7 \times 10^{-6}$ in./in./° F. from 80 to 800° F. Therefore, a specific object of this invention is to provide a ground coat composition exhibiting thermal expansion characteristics falling in this range, suitable for use with mild steel substrates.

As previously stated, a ground coat must be substantially free of enameling defects such as pinholes, blisters, etc. It is yet another object of this invention to provide ground coat compositions that are formulated to effect the above stated objects of high temperature strength and thermal stability, yet also be substantially free of enameling defect.

Although these coatings are specifically directed to achieve the dual function of crystallization and solution of relatively large amounts of oxide scale, they may be used on base metals such as Inconel, stainless steels and the Hastelloys. This is because these metals do not form as much oxide as mild steels, and thus the disclosed ground coats can adequately dissolve the scale formed by them. However, these coatings crystallize less than others, such as disclosed in our co-pending application, and therefore are less suitable for use on alloy substrates in high temperature operations.

It is a further object of this invention to provide a composite article comprising the novel ground coats disclosed herein.

Other objects and advantages of this invention will become apparent when read in conjunction with the following description of our invention.

Briefly stated, we have found that by a partial substitution of $P_2O_5$ for $B_2O_3$, ground coats may be formulated that not only dissolve iron oxides, but also crystallize in a satisfactory manner. Furthermore, the addition of $P_2O_5$ results in ground coats exhibiting significantly increased thermal expansion and thus reduces undesirable interfacial stresses. In addition, we have found that the properties of said $P_2O_5$ containing crystallizable ground coats may be adjusted by the use of oxides such as BaO, CaO, MgO, $TiO_2$, etc. in amounts which cause them to take part in the crystallization.

In the application of enamel coatings to metal substrates, it is recognized that application to mild or low carbon steels presents difficulties that are not present in high alloy materials. These mild or low carbon steels tend to develop relatively large quantities of scale during heat treatment and processing. In most carbon steel ground coats, large amounts (8-15%) of $B_2O_3$ are used to aid in scale solution. However, $B_2O_3$ cannot be used in such quantities in conventional ground coat glasses when crystallization is also desired.

In our ground coats $P_2O_5$ and $B_2O_3$ are both necessary and the amounts present must be maintained within critical limits. Too much $B_2O_3$ inhibits crystallization and decreases the thermal expansion. However, too much $P_2O_5$ will prevent smelting of the glass. $B_2O_3$ is a good flux and compensates for the effect of the $P_2O_5$ on smelting, and $P_2O_5$ compensates for the loss of scale solution properties caused by the decreased $B_2O_3$ content. The total content of $B_2O_3$ ad $P_2O_5$ cannot exceed 20% of the preferred ratio of $P_2O_5$: $B_2O_3$ is 1:1. However, compositions within the range of 1:3 to 2:1 are useful for the practice of our invention.

In the glass compositions set forth in this disclosure $SiO_2$ is the principal glass former. Amounts significantly greater than 65% will cause the coating to be too refractory, while amounts significantly less than 45% result in too fluid a coating.

BaO, MgO, and CaO are also crystal formers. In addition they contribute to thermal expansion, fusion, and smelting properties. Regulation of these oxides is necessary to control the rate of crystal growth.

The alkali oxides, $Na_2O$, $Li_2O$, and $K_2O$ are essential aids in adjusting thermal expansion, smeltability and particularly fusion temperatures. The glass compositions would not be useful for ground coats in the absence of these constituents as the firing temperatures would be excessively high. However, the use of $Li_2O$ should be carefully regulated as too much seems to promote enameling defects.

$TiO_2$ contributes to crystal formation, however, below 5% it is not effective, and in amounts greater than 20% pure $TiO_2$, which is of no particular value in these glasses, precipitates. While some ground coats have been prepared without $TiO_2$, best results thus far have included $TiO_2$.

Adherence oxides, such as $Co_3O_4$, NiO, $MnO_2$, etc. aid in the chemical bonding of the ground coat to the base metal.

Amounts up to 3% can be used for this purpose. Greater amounts are not harmful, but are of no particular advantage.

Various other oxides such as $CeO_2$, SrO, ZnO, ZrO, etc. could be used to affect certain properties of the disclosed glasses. However, amounts in excess of 5% would probably significantly alter the properties.

Specifically, we have found that compositions within the following ranges are suitable for use as partially crystallized ground coats on mild steel substrates.

| | Percent |
|---|---|
| $SiO_2$ | 45-65 |
| $P_2O_5$, $B_2O_3$ | [1] 5-20 |
| BaO, CaO, MgO | 4-20 |
| $Na_2O$, $K_2O$, $Li_2O$ | 9-23 |
| $TiO_2$ | 5-20 |

Adherence oxides, up to 3 percent.

[1] The total of $P_2O_5$ and $B_2O_3$ not to exceed 20%, and the ratio of $P_2O_5$ and $B_2O_3$ being between 1:3 and 2:1.

The following examples will further illustrate the practice of the subject invention:

EXAMPLE I

Raw batch materials were dry mixed in amounts calculated to provide a glass having a weight percent analysis of:

| | Percent |
|---|---|
| $SiO_2$ | 50 |
| $B_2O_3$ | 6 |
| $P_2O_5$ | 6 |
| BaO | 10 |
| $Na_2O$ | 15 |
| $K_2O$ | 1.5 |
| $TiO_2$ | 10 |
| Adherence oxides | 1.5 |

The resulting batch was fused at a temperature between 2400–2800° F., and the molten glass was quenched directly into cold water to produce a frit.

The frit was milled in water with appropriate mill additions, including clay, sodium nitrite, potassium chloride, etc., to produce a slip. The slip was spray applied to a low-carbon steel plate, the surface of which had previously been blasted with $Al_2O_3$ grit. After drying to remove excess water the article was then heated to a temperature between 1600–1850° F. to fuse the glass. The viscosity at fusion was about 3000 poises.

After fusion of the ground coat a crystallizable cover coat was applied thereover.

Finally the composite article was heat treated at about 1450° F., thereby partially crystallizing both the ground coat and the cover coat.

A comparison of the physical properties of a composite formed according to Example I and an article similarly treated but including an amorphous borosilicate ground coat follows:

THERMAL SHOCK

| Ground coat | Cover coat | Glass loss, (° F.) | Failure temp. (° F.) |
|---|---|---|---|
| Borosilicate | Cryst | 500 | 700 |
| $P_2O_5$ type | Cryst | 700 | 1,000 |

IMPACT RESISTANCE

| Ground coat | Cover coat | 1st contact (in. lbs.) | Glass loss (in. lbs.) |
|---|---|---|---|
| Borosilicate | Cryst | 40–45 | 100–120 |
| $P_2O_5$ type | Cryst | 55–65 | 130–160 |

EXAMPLE II

Raw batch materials were dry mixed in amounts calculated to provide a glass having a weight percent analysis of:

|  | Percent |
|---|---|
| $SiO_2$ | 51.9 |
| $P_2O_5$ | 4.8 |
| $B_2O_3$ | 4.8 |
| BaO | 4.8 |
| $Na_2O$ | 14.3 |
| $K_2O$ | 4.8 |
| $TiO_2$ | 14.3 |
| Adherence oxides | 1.0 |

The resulting batch was smelted at a temperature between 2500 and 2700° F., fritted, and milled with appropriate mill additions. The resulting slip was applied to a low-carbon steel plate to build a thickness of 6–8 mils and then fused at a temperature between 1750 and 1800° F.

After fusion of the ground coat a crystallizable cover coat was applied thereover and the composite article was heat treated at a temperature of about 1440° F. Upon such treatment a stuffed barium silicate solid-solution type crystal was found to be predominant.

The resulting composite article exhibited improved thermal shock properties compared to articles having an amorphous borosilicate type ground coat. The failure temperature was increased 250–300° F. and the temperature at which the first glass loss occurs was increased 150–200° F. The thermal expansivity was considerably higher than conventional borosilicate ground coats, thus interfacial shear and the tendency toward violent or premature failure upon exposure to impact or thermal shock was reduced.

Impact resistance properties were determined by subjecting the article after impacting to an applied voltage of 10,000 volts and determining the extent of electrical contact. The subject article could be exposed to 20% more impact force before the first electrical contact between the probe and base metal occurred. Furthermore, a 30% increase in impact resistance was noted before the first glass loss occurred.

The term partial crystallization as used herein means the formation of crystals in situ within an amorphous matrix. Wherever the term ground coat is used it should be understood to include the practice of forming a thick ground coat by the successive application of a plurality of thin coats prior to the application of the final surface coat.

The term cover coat should also be construed to include a plurality of glass coats, each having the composition of a cover coat as contrasted to that of a ground coat. A suitable crystallizable cover coat composition is as follows:

|  | Percent |
|---|---|
| $SiO_2$ | 58.3 |
| $Na_2O$ | 4.5 |
| $B_2O_3$ | 5.1 |
| $TiO_2$ | 9.0 |
| SrO | 3.0 |
| $Li_2O$ | 9.6 |
| $Al_2O_3$ | 10.5 |

With respect to the method of application of the glass coats, although we have described a spraying method, this is not considered a limitation. Any of the commonly used methods are within the scope of our invention.

It will thus be seen that this invention attains its stated objects. It provides a crystallizable ground coat suitable for use with low carbon or mild steels and having physical and thermal properties that enhance composite articles including high-strength high temperature cover coats. Further, this invention provides ground coats with the combined properties of viscosity at fusion suitable for easy flow over metallic substrates and increased refractoriness in the final product. These ground coats also permit the obtaining of thermal expansion characteristic suitable for use with mild or low carbon substrates, without sacrificing scale solution properties or ease of crystallization. In addition, ground coats according to this invention are substantially free of enameling defects and thus provide heretofore unavailable high-strength corrosion-resistant composite articles including mild steel or low carbon substrates, rather than expansive alloy substrates.

We claim:

1. A crystallizable ground coat enamelling glass for use on mild steel substrates to dissolve scales formed on the substrate during the firing of the ground coat, said crystallizable ground coat enamelling glass consisting essentially of 5–20% by weight of a mixture of $P_2O_5$ and $B_2O_3$, the weight ratio of $P_2O_5$ and $B_2O_3$ being within the range of about 1:3 and 2:1; 4–20% by weight of alkaline earth oxide; 9–23% by weight of alkali oxide; 0–20% by weight of $TiO_2$; and 45–65% by weight of $SiO_2$.

2. The glass of claim 1 wherein the weight percent ratio of $P_2O_5$ to $B_2O_3$ is substantially 1:1.

3. A crystallizable ground coat enamelling glass for use on mild steel substrates to dissolve scales formed on the substrate during the firing of the ground coat, the crystallizable ground coat enamelling glass consisting essentially of by weight percent:

|  | Percent |
|---|---|
| $SiO_2$ | 45–65 |
| $P_2O_5$ and $B_2O_3$ | [1] 5–20 |
| BaO, CaO, MgO | 4–20 |
| NaO, $K_2O$, $Li_2O$ | 9–23 |
| $TiO_2$ | 5–20 |
| Adherence oxides, up to 3 percent. | |

[1] The weight percent ratio of $P_2O_5$ to $B_2O_3$ being within the range of 1:3 and 2:1.

4. The glass of claim 3 wherein the weight percent ratio of $P_2O_5$ to $B_2O_3$ is substantially 1:1.

References Cited

UNITED STATES PATENTS

| | | | |
|---|---|---|---|
| 2,284,619 | 6/1942 | Epstein | 148—26 |
| 2,890,964 | 6/1959 | Commons et al. | 106—48 |
| 2,925,351 | 2/1960 | Judd | 106—48 |
| 3,098,753 | 7/1963 | Van Dolah et al. | 106—48 |

OTHER REFERENCES

King, B. W., Tripp, H. P., and Duckworth, W. H.; Nature of Adherence of Porcelain Enamels to Metals; in J. Amer. Cer. Soc., 42, No. 11, November 1959, pp. 504, 513, 514, 515 and 525.

HELEN M. McCARTHY, Primary Examiner

W. R. SATTERFIELD, Assistant Examiner

U.S. Cl. X.R.

106—52, 54; 117—129